UNITED STATES PATENT OFFICE 2,587,558

PREPARATION OF NOVEL 2-CARBOALKOXY-1,3-BUTADIENES AND POLYMERS THEREOF

Jerome C. Westfahl, Trumansburg, N. Y., and Daniel S. Sears, Cuyahoga Falls, Ohio, assignors to The B. F. Goodrich Company, New York, N. Y., a corporation of New York No Drawing. Application June 25, 1948,
Serial No. 35,285

9 Claims. (Cl. 260—89.3)

This invention relates to a method for preparing novel 2-carboalkoxy-1,3-butadienes by the pyrolysis of their dimers, and relates further to the preparation of polymers of said 2-carboalkoxy-1,3-butadienes.

In copending applications Serial No. 35,286, filed June 25, 1948, now U. S. Patent 2,548,184, and Serial No. 35,287, filed June 25, 1948, now U. S. Patent 2,480,892, two methods for preparing dimers of 2-carboalkoxy-1,3-butadienes are disclosed. One method consists in pyrolyzing a substituted butane of the formula

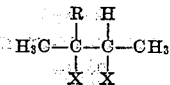

wherein R is a carboalkoxy radical and each X is a radical derived by removing the acidic hydrogen atom from an acid which is volatile at the temperature of pyrolysis.

A second method consists of pyrolyzing Δ'-substituted cyclohexenes of the formula

wherein R is a carboalkoxy radical.

The dimers which are obtained by the above methods are generally colorless oils which possess the formula

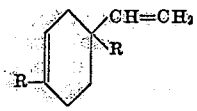

wherein R has the same meaning as above.

We have now discovered that when such dimers of 2-carboalkoxy-1,3-butadienes are pyrolyzed and the pyrolysate collected at very low temperatures, novel 2-carboalkoxy-1,3-butadienes are present in the monomeric form in substantial yield, and that when the monomers thus obtained are polymerized in the presence of a polymerization catalyst, polymers are formed which are excellent for a wide variety of uses.

The pyrolysis reaction to obtain 2-carboalkoxy-1,3-butadienes proceeds substantially as follows:

wherein R is a carboalkoxy radical.

The pyrolysis reaction may be carried out by several different procedures. For example, one preferred method consists in passing the vapors of the dimer over a hot resistance wire and collecting the reaction product in a receiver cooled to a very low temperature to maintain the 2-carboalkoxy butadiene in the monomeric form. Variations in this procedure include the use of a metal or a glass pyrolysis tube in place of a heated resistance wire, or passing the vapors through the tube or over a heated wire together with a current of an inert vapor or gas such as carbon dioxide or nitrogen to insure passage of the vapors through the pyrolysis tube.

It is desirable in carrying out the reaction that reduced pressures be employed. Accordingly, pressures below 50 mm. are preferred, although pressures up to and including atmospheric pressure are operative.

The temperature at which the pyrolysis is carried out may be varied widely. The optimum temperature is in the range of 750° to 850° although temperatures of from 400° C. or lower to 900° C. or even higher may be utilized.

As disclosed hereinabove, the reaction product is collected in a receiver which is cooled to low temperatures in order to maintain the 2-carboalkoxy-1,3-butadiene in the monomeric form and prevent subsequent dimerization which may occur at temperatures of about 0° C. or higher. Thus, it is desirable that the receiver be maintained at temperatures below 0° C., and especially below —50° C. in order to insure highest yields of monomer. The monomer obtained by the above method is a yellow liquid which is substantially pure and may be polymerized without further purification.

The polymerization of 2-carboalkoxy-1,3-butadienes prepared according to the method of this invention is preferably carried out by placing the monomer in a diluent-refrigerant such as methyl chloride, liquid propane, liquid ethane, liquid ethylene, or solid carbon dioxide and the like, and maintaining the mixture at temperatures below —50° C., and preferably between —75° C. and —150° C. The solvent may be present in any desired amount, but in general a ratio of from 1 to 5 parts of solvent for each part of monomer is preferred. A polymerization catalyst, desirably a Friedel-Crafts catalyst such as aluminum chloride, aluminum bromide, zirconium chloride, titanium tetrachloride, boron trifluoride, uranium chloride and the like, or other usual polymerization catalyst dissolved in a solvent such as ethyl chloride, methyl chloride or other solvent which does not react with the catalyst is then added to the cooled monomer-solvent solution in catalytic amounts. The coolant medium is then removed and the mixture allowed to warm to room temperature whereupon the solvent boils off. Upon the addition of an alcohol, the 2-carboalkoxy-1,3-butadiene polymer precipitates as a clear or slightly yellow, insoluble, powdered resin.

The 2-carboalkoxy-1,3-butadienes may also be polymerized by other methods. For example, the monomer-solvent solution may be added to the catalyst solution or the monomer may be polymerized without employing a solvent, or if desired the polymerization may be conducted in an aqueous dispersion provided suitable solvents are present in the aqueous phase so that it can be maintained in liquid condition at temperatures below 0° C. Furthermore the 2-carboalkoxy-1,3-butadienes may be copolymerized with other monomers such as isobutylene and the like to form rubbery copolymers which are very useful in the preparation of tires, tubes and other elastic materials.

The polymers prepared by the above methods are substantially linear in character and generally possess molecular weights in excess of 25,000. Such polymers are ordinarily colorless or slightly yellow in appearance, are insoluble in a great number of common solvents and are highly resistant to chemicals such as acids and bases. They may be compounded with a variety of substances to produce modifications of their physical properties.

The following examples illustrate the pyrolysis of 2-carboalkoxy-1,3-butadiene dimers to obtain the monomer and the polymerization of the monomer, although the invention is not limited thereto, for there are, of course, numerous modifications. All parts are by weight.

Example I 3 parts of the dimer of 2-carbomethoxy-1,3-butadiene are pyrolyzed over a nickel-chromium wire heated to a temperature of 750° to 850° C. The pyrolysate is collected in a receiver cooled to a temperature of −77° C. The product is a yellow liquid which is identified as monomeric 2-carbomethoxy-1,3-butadiene by preparing a derivative, the amide of dl-methyl-ethyl-acetic acid. This derivative has a melting point of 111° C. which is the same as the melting point given for the amide of dl-methyl-ethyl-acetic acid in the literature.

Example II

Example I is repeated except that the vapors of the 2-carbomethoxy-1,3-butadiene dimer are passed through a metal tube at 750° to 850° C. instead of over a heated resistance wire. 2-carbomethoxy-1,3-butadiene is again obtained in good yield.

Example III 5 parts of monomeric 2-carbomethoxy-1,3-butadiene are diluted with 15 parts of methyl chloride, the solution being maintained at a temperature of −75° C. 1 part of a saturated solution of aluminum chloride in methyl chloride cooled to −75° C. is then added to the monomer solution. The mixture is then allowed to warm to room temperature whereupon the methyl chloride boils off and the solution changes from a yellow to a slightly brownish color. Ethyl alcohol is added and a polymer of 2-carbomethoxy-1,3-butadiene precipitates as an insoluble powder.

Example IV

Example III is repeated using a 45% solution of boron fluoride in ether as the catalyst. The powder which precipitates is heated to about 250° C. whereupon fusion occurs. Upon cooling, a yellow resin is obtained.

As disclosed hereinabove, 2-carboalkoxy-1,3-butadienes may be polymerized to form a large number of useful materials. The monomers may also be used to form addition products with other substances and as such are valuable in aiding in the separation of various compounds from mixtures and for many other uses.

The polymers of this invention are useful in the form of molded objects, rods, tubes, sheets and in preparing copolymers useful in synthetic rubbers and resins and similar materials as well as in many other important applications.

Although specific examples are included herein, it is not intended to limit the invention thereto, for numerous variations and modifications will be apparent to those skilled in the art, and are within the scope of the appended claims.

We claim:

1. The method which comprises pyrolyzing a dimer of a 2-carboalkoxy-1,3-butadiene and recovering said 2-carboalkoxy-1,3-butadiene in the monomeric form at a temperature below 0° C.

2. The method which comprises pyrolyzing a dimer of a 2-carboalkoxy-1,3-butadiene at a temperature of from 400° C. to 900° C. and recovering said 2-carboalkoxy-1,3-butadiene in the monomeric form at a temperature below 0° C.

3. The method of claim 2 wherein the pyrolysis temperature is from 750° C. to 850° C. and the temperature at which the monomer is recovered is below −50° C.

4. The method which comprises pyrolyzing a dimer of 2-carbomethoxy-1,3-butadiene at a temperature of from 750° C. to 850° C. and recovering monomeric 2-carbomethoxy-1,3-butadiene in a receiver cooled to a temperature below −50° C.

5. A substantially linear polymer of a 2-carboalkoxy-1,3-butadiene, said polymer being prepared by adding a Friedel-Crafts catalyst to the monomer while cooling the monomer to a temperature below 0° C., and then discontinuing the cooling, whereupon said polymer forms as an insoluble powder.

6. A substantially linear polymer of a 2-carboalkoxy-1,3-butadiene, said polymer having a molecular weight in excess of 25,000 and being prepared by adding a Friedel-Crafts catalyst to the monomer while cooling the monomer to a temperature below 0° C., and then discontinuing the cooling, whereupon said polymer forms as an insoluble powder.

7. A substantially linear polymer of 2-carbomethoxy-1,3-butadiene, said polymer having a molecular weight in excess of 25,000 and being prepared by adding a Friedel-Crafts catalyst to a mixture of the monomer and methyl chloride while cooling the monomer to a temperature below −50° C., and then discontinuing the cooling and adding ethyl alcohol, whereupon said polymer precipitates as an insoluble powder.

8. The method which comprises adding a Friedel-Crafts catalyst to a monomeric 2-carboalkoxy-1,3-butadiene while cooling the monomer to a temperature below 0° C., and then discontinuing the cooling, whereupon polymerization occurs to form a substantially linear polymer of said 2-carboalkoxy-1,3-butadiene.

9. The method which comprises adding a

Friedel-Crafts catalyst to monomeric 2-carbomethoxy-1,3-butadiene while cooling the monomer to a temperature below 0° C., and then discontinuing the cooling, whereupon polymerization occurs to form a substantially linear polymer of said 2-carbomethoxy-1,3-butadiene.

JEROME C. WESTFAHL.
DANIEL S. SEARS.

REFERENCES CITED

The following references are of record in the file of this patent:

UNITED STATES PATENTS

| Number | Name | Date |
|---|---|---|
| 2,232,944 | Gudgeon et al. | Feb. 25, 1941 |
| 2,395,812 | Gudgeon et al. | Mar. 5, 1946 |
| 2,412,296 | Shapiro | Dec. 10, 1946 |

FOREIGN PATENTS

| Number | Country | Date |
|---|---|---|
| 460,009 | Great Britain | Jan. 19, 1937 |
| 584,622 | Great Britain | Jan. 20, 1947 |